Sept. 9, 1969 J. R. SUMMERS 3,466,135
CANDLE MAINTAINING DEVICES
Filed April 26, 1968 5 Sheets-Sheet 1
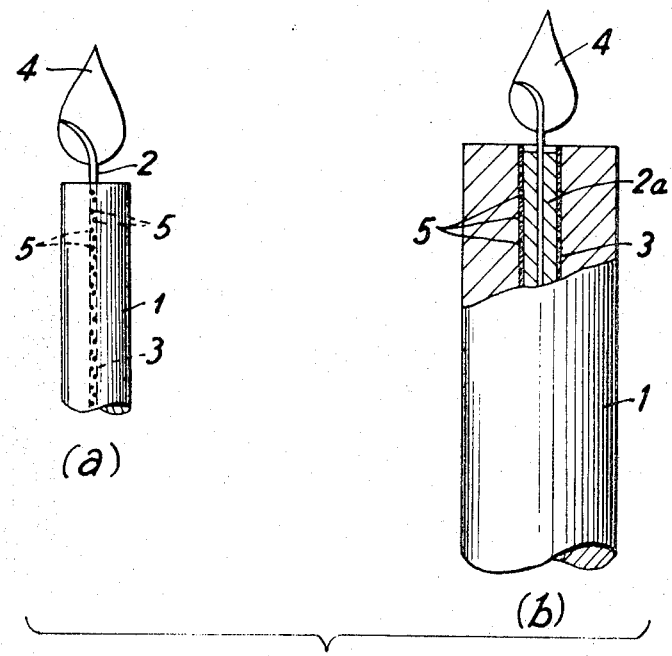
FIG. 1
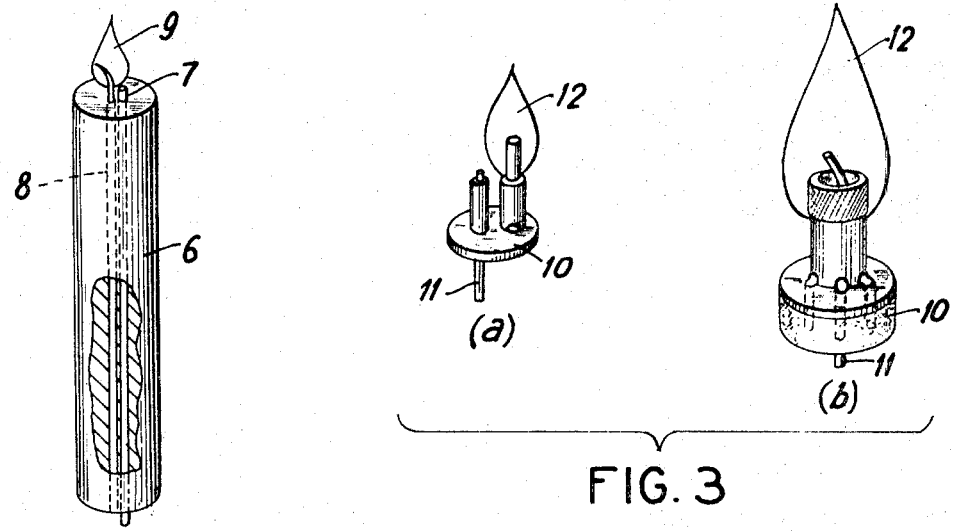
FIG. 2
FIG. 3
INVENTOR.
JAMES R. SUMMERS
BY
ATTORNEYS Sept. 9, 1969  J. R. SUMMERS  3,466,135
CANDLE MAINTAINING DEVICES
Filed April 26, 1968  5 Sheets-Sheet 2
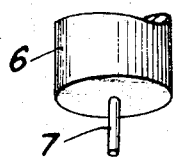
FIG. 4
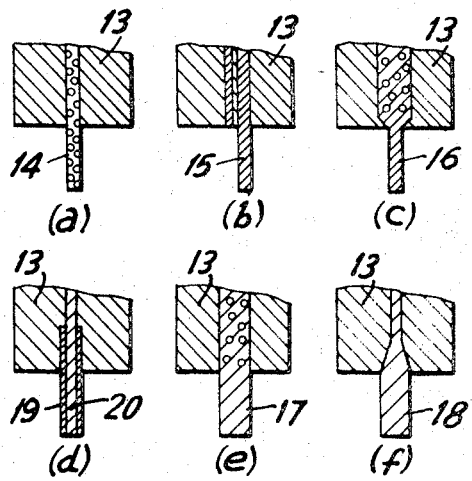
FIG. 5
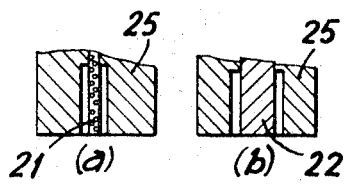
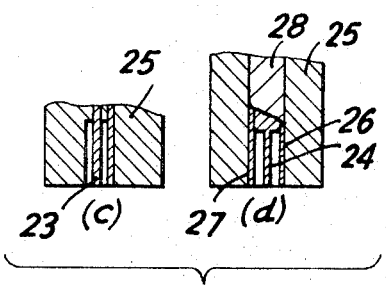
FIG. 6
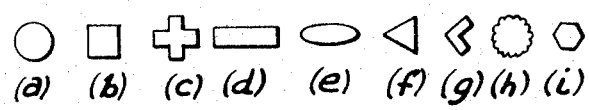
FIG. 7
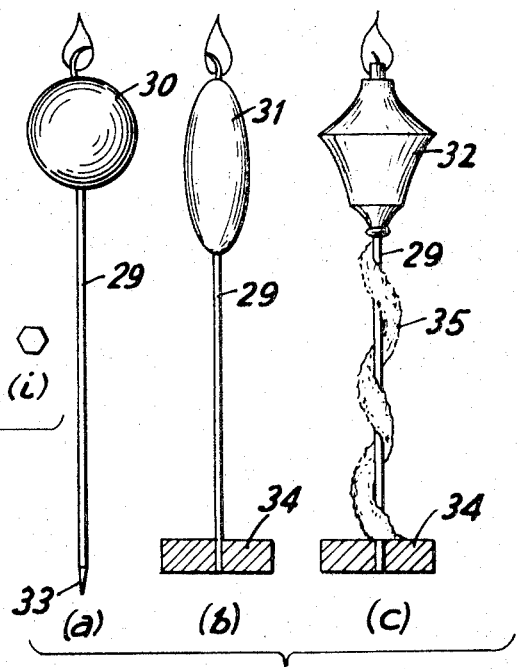
FIG. 8
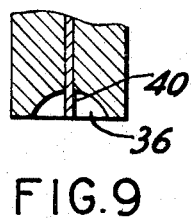
FIG. 9
INVENTOR.
JAMES R. SUMMERS
BY *Auslander + Thomas*
ATTORNEYS

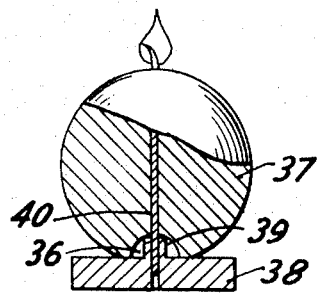
FIG. 10
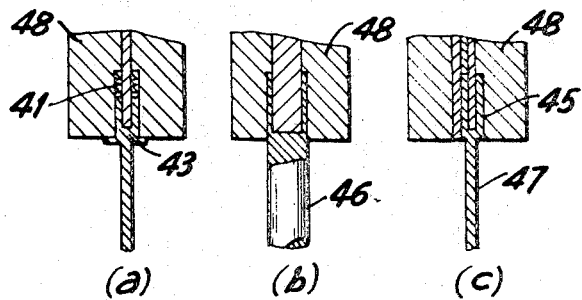
FIG. 12
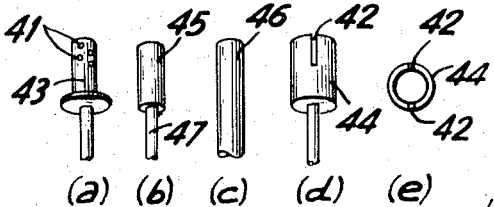
FIG. 11
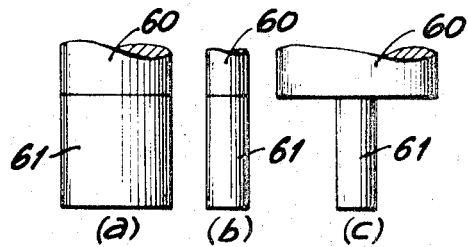
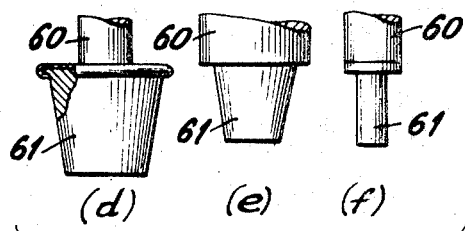
FIG. 14
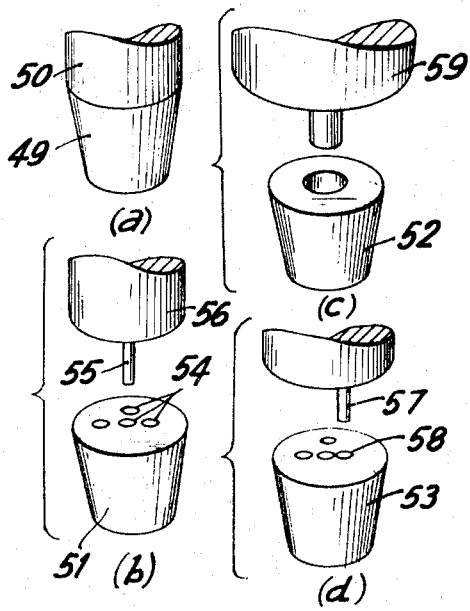
FIG. 13
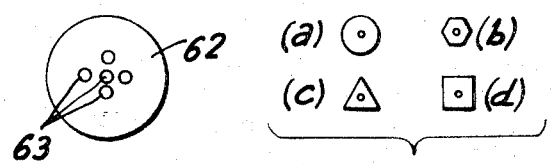
FIG. 15    FIG. 16

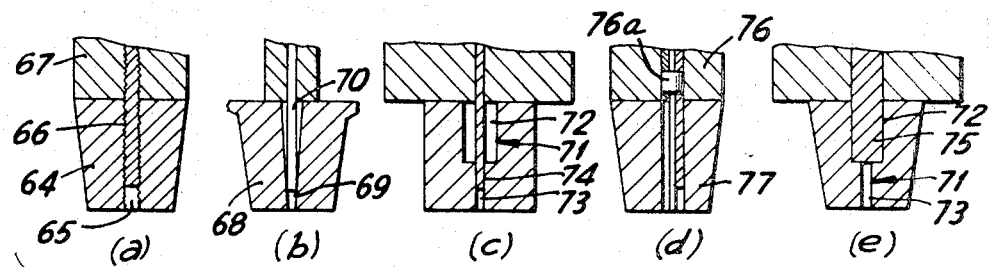
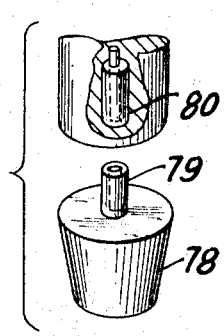
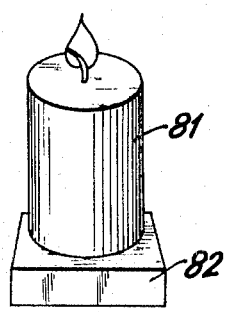
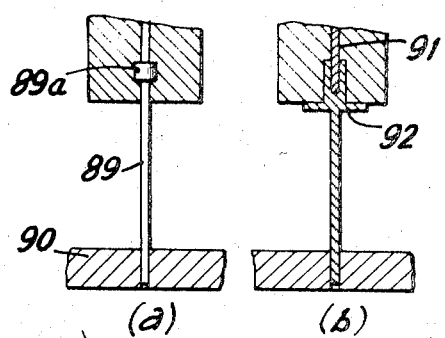
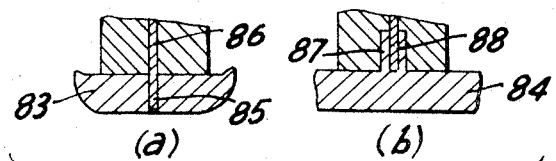
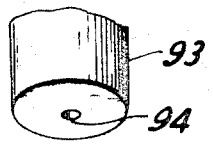
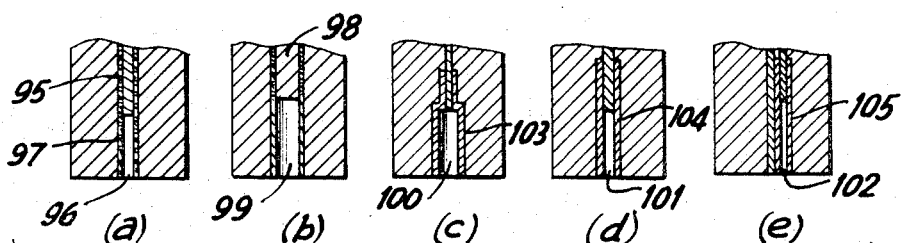

Sept. 9, 1969    J. R. SUMMERS    3,466,135
CANDLE MAINTAINING DEVICES
Filed April 26, 1968    5 Sheets-Sheet 5
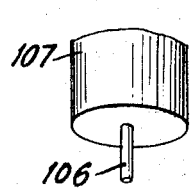
FIG.24
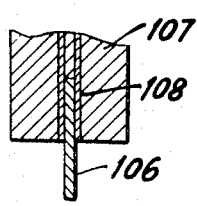
FIG.25
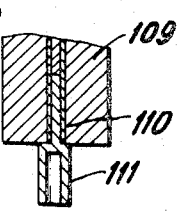
FIG.26
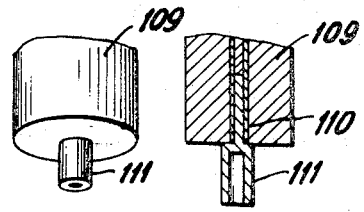
FIG.27
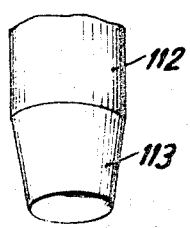
FIG.28
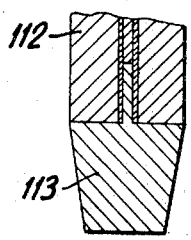
(a)
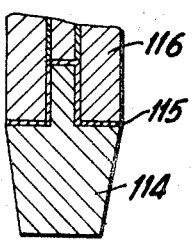
(b)
FIG.29
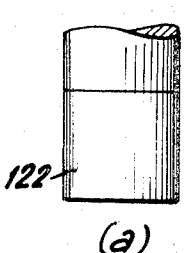
(a)
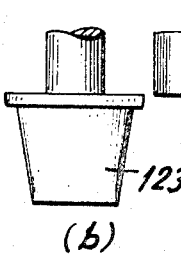
(b)
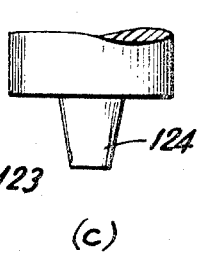
(c)
FIG.32
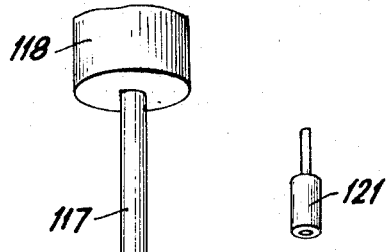
FIG.30
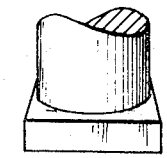
FIG.31
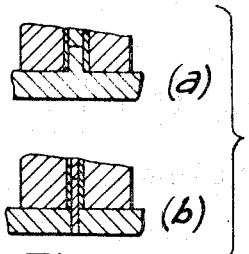
FIG.33
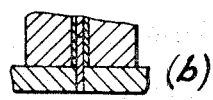
(a)
(b)
FIG.34
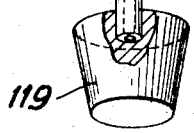
FIG.35
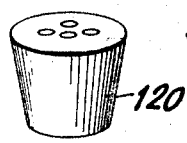
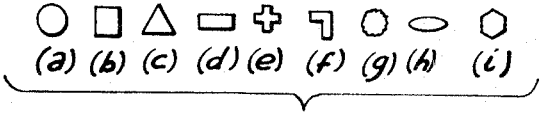
(a) (b) (c) (d) (e) (f) (g) (h) (i)
FIG. 36
INVENTOR.
JAMES R. SUMMERS
BY
ATTORNEYS United States Patent Office 3,466,135
Patented Sept. 9, 1969

3,466,135
CANDLE MAINTAINING DEVICES
James R. Summers, 353 E. 50th St.,
New York, N.Y. 10022
Continuation-in-part of applications Ser. No. 406,037, Oct. 23, 1964, Ser. No. 577,268, Sept. 6, 1966, Ser. No. 581,105, Sept. 21, 1966, and Ser. No. 705,252, Dec. 5, 1967. This application Apr. 26, 1968, Ser. No. 724,440
Int. Cl. F23d 3/16, 3/18, 3/40
U.S. Cl. 431—289           40 Claims

ABSTRACT OF THE DISCLOSURE

The present invention relates to candle maintaining devices providing an integral member to a candle which imparts the strength of the member to the body of the candle and serves as a mounting member to maintain a candle in upright position. The member generally extends longitudinally along the length of the candle to at least the base of the candle and is consumable with the descending flame of the candle.

---

The present invention relates to candle maintaining devices and is a continuation-in-part of U.S. patent applications Ser. Nos. 406,037, filed Oct. 23, 1964 for Rigid Wick and Candle Wick; 577,268, filed Sept. 6, 1966 for Rigid Wick and Candle Wick; 581,105, filed Sept. 21, 1966 for Rigid Candle Wick and Rigid Candle Device, now Patent No. 3,380,797 and 705,252, filed Dec. 5, 1967 for Rigid Candle Wick and Rigid Candle Device.

Candles and devices associated with them have been known for centuries, however in certain respects the advances in the art have been limited. A constantly reoccurring problem has been that of the maintaining of candles securely within their holders. Another major problem has been in the distortion of candles due to bending, sagging, tipping and chipping. In many respects these problems are interrelated.

Candles generally, that is the various types of candles such as tapers, candles of large diameter and small birthday candles, are generally made of a wax material. Since such material is susceptible to distortion when heated, candles during use have a tendency to become distorted. This problem can also occur where candles are otherwise subjected to heat during display and/or storage, particularly in hot weather.

In the use of candles this same problem affects the mounting of candles in bases, stands, candelabra or the like.

There are two basic methods or devices that are used at present for holding or supporting a candle in an upright position for burning. These are the cup holder and the upright spike. The cups are either cylindrical or tapered along their inner peripheries and the spikes are either generally symmetrical or tapered. These devices are problemsome and at best give only rigidity that is imparted to a small lower section of the candle.

In an attempt to get a candle or taper to fit properly in a cup holder or on an upright spike many devices have been employed. Rubber or plastic ring bands, plastic pads, bits of paper, and adhesive wax bases are used around bases of candles or tapers for getting them to fit firmly into a cup or holder.

Some candles are made with a bored-out socket that is large enough to accommodate an upright spike. This socket is oftentimes filled with a substance which is tacky, pliable and deformable at room temperature. This substance does grip the spike, but at best only limited nonrigid support is afforded. Candles that have no hole provided in their base tend to split or crack when the spike is pushed into them.

Even when a proper hole is provided to fit the upright spike, support is only imparted to the lower region of the candle. Spikes are generally made of a non-combustible material, generally of metal, which are then mounted on some form of base or holder. If a wick runs to the bottom of a candle which employs an upright spike the heat of the flame will heat the spike, thus causing the candle to loosen, tip, or fall from the spike. To avoid this, the wick can be shortened, however this then reduces the burning length of the candle.

Another problem with such devices resides in present day usage of hard heat resistant waxes such as stearin, in candles. These waxes were developed to combat the bending and warping problems hereinbefore discussed, but using such waxes, especially on thinner candles, such as tapers, makes spiking of such candles for mounting difficult. Candles of such waxes are relatively brittle and tend to break or chip when used either in receptacle holders or with internal spikes.

According to the present invention a stiffened wick, stiff core, or core-wick combination which extends longitudinally substantially along the entire length of the candle not only provides the desired stiffness to the candle body, but serves as an integral anchor either alone or in conjunction with other devices for the mounting of candles.

It may be noted that even a cracked candle or taper of the present invention will still stand straight. It can be cracked in a number of places, even with a portion of the candle falling away, and still retain its upright posture, whereas a candle with a conventional wick when cracked will fall to one side putting strain on the candle and its stability in or on a base or holder.

In the co-pending applications hereinbefore referred to, are disclosed various wicks, stem wick combinations, core-wicks, and stiffening devices which impart the desired stiffness to the candle body, extend longitudinally substantially along the length of the candle and are consumable by the descending flame of the candle. Such devices provide the integral mounting structure employed in the present invention to be used either alone or to provide with other devices plugs or sockets for stable candle mounting.

Although such novel feature or features believed to be characteristic of the invention are pointed out in the claims, the invention and the manner in which it may be carried out may be further understood by reference to the description following and the accompanying drawings.

FIGS. 1a and b are enlarged sections of candles including a wick and wick and core employable with the present invention.

FIG. 2 is a cut-away front elevation of a candle with a core-wick.

FIGS. 3a and b are perspective views of a stem wick and cores.

FIG. 4 is a sectional view of a candle of the present invention.

FIGS. 5(a–f) are sectional views of various embodiments of candles having male retention members of the present invention.

FIGS. 6(a–d) are sectional views of various embodiments of candles having recessed plug members of the present invention.

FIGS. 7(a–i) are bottom views of various shaped retention members of the present invention.

FIGS. 8(a–c) are side elevations of candles of the present invention having extended mounting elements.

FIG. 9 is a sectional view of another recessed plug embodiment of the present invention.

FIG. 10 is a side elevation partly in section of a candle employing the mounting means of FIG. 9.

FIGS. 11(a–e) are perspective views of extender members of the present invention.

FIGS. 12(a–c) are sectional views of candles showing various of the extender members in active engagement.

FIGS. 13(a–d) are perspective views of various adapters of the present invention, with candles thereon.

FIGS. 14(a–f) are side elevations of an assortment of candles mounted with various adapters.

FIG. 15 is a top view of another adapter of the present invention.

FIGS. 16(a–d) are top views of various shaped adapters with openings.

FIGS. 17(a–e) are sectional views of various candles mounted on adapters.

FIG. 18 is an exploded cut-away view in perspective of another adapter and plug combination of the present invention.

FIG. 19 is a perspective view of a mounted candle of the present invention.

FIG. 20a and b are sectional views of other candle mounting arrangements of the present invention.

FIGS. 21a and b are sectional views of other candle mounting arrangements providing a raised mounting of candles.

FIG. 22 is a perspective view of a candle section which is lower having an internal mounting socket.

FIGS. 23(a–e) are section views of alternative embodiments of internal sockets.

FIG. 24 is a perspective view of a lower candle section having an extender mounted therein.

FIG. 25 is a sectional view of FIG. 24.

FIG. 26 is a perspective view of the lower section of a candle having an extender with a hollow portion therein.

FIG. 27 is a sectional view of the candle of FIG. 26.

FIG. 28 is a perspective view of a candle and candle adaptor of the present invention.

FIGS. 29a and b are seceional views of alternate embodiments of the candle and adaptor mount of FIG. 28.

FIG. 30 is a perspective view of a candle, adaptor and extender of the present invention.

FIG. 31 is a perspective view of a female adaptor of the present invention.

FIGS. 32(a–c) are side elevations of various adaptors of the present invention.

FIG. 33 is a perspective view of the lower section of a candle mounted to a base of the present invention.

FIGS. 34a and b are sectional views of alternative embodiments of the mounting of FIG. 33.

FIG. 35 is a perspective view of an adaptor having a plurality of openings therein.

FIGS. 36(a–i) are sectional views of a selection of shapes employable for the openings of FIG. 35.

Referring now to the figures in greater detail, where like reference numbers denote like parts in the various figures.

FIGS. 1a and b, 2, 3a–b are views of the various basic integral means employed in candles of the present invention to provide firmness to the candle body substantially along its entire length.

In FIG. 1a the candle 1 is provided with a wick configuration for this purpose. The wick 2 includes an outer portion 3 havings openings 5, the outer portion burnable and consumable by the flame 4. The outer portion 3 is resistive to absorption of melted wax, and has a temperature of ignition in excess of that of the candle wax. In FIG. 1b an inner portion of wicking material such an generally employed in the art is adapted to sustain the flame and a layer of wax 2a is interposed between the wick and outer portion 3. The outer portion 3 includes a plurality of openings 5 which allows therethrough the passage of melted wax, thus allowing contact of the inner wicking with the melted wax. FIGS. 1a and b thus illustrate wicks having as integral constituents, a firmness which is imparted to the candle 1. Various other embodiments of wicks having these characteristics are more particularly described in prior filed applications as aforementioned.

FIG. 2 is illustrative of a core-wick combination within a candle. In FIG. 2 a candle 6 is provided with a core 7 which extends longitudinally along the length of the candle 6 in substantial parallel alignment to the wick 8, the core 7 consumable by the flame 9 as it descends along the wick 8. This too is an illustrative embodiment of various combinations of core-wick candles as described in prior filed applications.

FIGS. 3a–b are illustrative of a stem-wick combination 10, the stem-wicks 10 riding along a core 11, the core 11 is consumable by the flame 12 as the stem-wick 10 descends. The stem-wick 10 is, again, but illustrative of various embodiments described in prior applications.

What is common to all of the foregoing embodiments is the provision therein of a stiffening portion integral to a candle running longitudinally substantially along the entire length of the candle and which is burnable and consumable by the flame. The portion may be of various burnable materials. For example, the outer portion 3 of FIG. 1a may be of cellulosic material, or other materials such as glassine. The cores 7, 11 of FIGS. 2 and 3 may be, for example, of bamboo, wood, plastic, impregnated or sheathed fabric, as may be the outer layer 3 of FIG. 1b.

As shown in the remaining figures, these consumable cores or core-wicks or wicks may be employed as anchors and serve as plugs or sockets for the mounting of candles. Such implementation additionally serves to enhance the support which such cores or wicks impart to candles. Whereas for example a core of bamboo is flexible, when emplaced within a candle such structure imparts a stiffness to a candle. Where such core is anchored at one end, the anchoring combined with the bond between the candle wax and the length of the core provides a rigidity to the candle along its entire length.

As shown in FIGS. 2 and 4, the core 7 extends outward from the base of the candle, such extension employable as a plug.

A plurality of such external plugs are illustrated in FIG. 5. FIG. 5a shows a candle 13 having a plug 14 which is an extension of a stiff wick configuration such as illustrated in FIG. 1a. FIG. 5b shows a plug 15 such as in a core-wick candle of FIG. 2.

FIG. 5c illustrates a plug 16 which is an extension of a core-wick combination as shown in FIG. 1b. The outer layer, such as cellulose acetate, can be compressed to form plug 16. A reinforcing outer layer 19 may be included along the end length portion of the plug 20 such as shown in FIG. 5d, with the reinforcing layer extending inward of the candle body. Also this reinforcing outer layer 19 can be used to give plugs uniform size, such as plugs of bamboo, or wood which may vary in size. FIG. 5e shows the core-wick combination of FIG. 1b coming down from the candle without any reduction in size as shown in FIG. 5c. The size can of course vary between FIGS. 5c and 5e. FIG. 5f shows how a bamboo or wood core for a stem wick can be increased in size. This could also be done with the core 15 of FIG. 5b.

In the event the candle is very large and of great weight and/or on a very long extender or extended plug, the supporting layer 19 of FIG. 5d may be desireable. The added layer can make the extender or extended plug completely rigid since the supporting layer could be even made of metal.

In FIGS. 6a–d there is shown plugs 21, 22, 23 and 24 respectively. The plugs therein described do not extend beyond the periphery of the candles 25, but are rather recessed within the bottom of the candle body. An open area 26 is provided in the candles 25 so that an adaptor socket as hereinafter described may be employed to link the plugs 21, 22, 23 and 24 to a base.

As shown in FIG. 6d, in lieu of an open area 26 within the candle body, such area may be provided internal of the plug 24 itself by providing a hollow area 27 between the outer wall of the core 28 and the narrower diameter plug 24.

The recessed plugs can, of course be modified in the manners discussed with respect to FIG. 5 and can vary in size and treatment as shown. The openings or pores in the rigidized wick shown in FIG. 5a can be stopped just short of the bottom of the candle so as to put the candle out before it burns completely to the bottom if so desired. This could also be done with wick or core-wick of FIGS. 5c or 5e.

In FIG. 7(a–i) assorted shapes of plugs are shown, the various patterns being merely illustrative of some basic symmetrical shapes which may be employed. Based upon the nature of the plug, and aesthetic sensibilities, various other symmetrical as well as asymmetrical shapes may be employed.

In FIGS. 8a–c, the plugs 29 are of the extended type and are adaptable to anchor the candles 30, 31 and 32. In FIG. 8a, the plug 29 includes a pointed end portion 33 and can be used to anchor the candle 30 in a log or other suitable surface. In FIGS. 8b and c, a base 34 is provided. Where the base is of a material such as foam-like plastic, the plugs 29 have sufficient strength to make its own mounting hole. As shown the plugs 29 fit into or onto the base and do not depend upon the wax base portion of the candles 30, 31, 32 to support the arrangement. Decorative effects such as the spiralled ornamentation 35 may be employed along the length of the plug 29.

Where a recessed plug is employed such as described in FIGS. 6a–d, the cut-away area around the plug may be enlarged. This is illustrated in FIGS. 9 and 10, where the enlarged cut-away area 36 allows sufficient space for a candle 37 to be mounted on a base 38 having an extending socket 39. The socket 39 is adapted to accept therein the plug 40.

Where recessed plugs are employed, extender sockets such as shown in FIGS. 11a–e may be used so as to provide a desired height to a candle or adapt such plugs for use on specific bases. The extender sockets may be of any suitable material. As shown in FIGS. 11a, d and e, special configurations may be desired. For example in FIG. 11a, the socket 43 includes opening 41 to provide the desired venting for a wick plug. Likewise, this venting may be accomplished by the provision of slots 42 in the socket 44 of FIGS. 11d, e.

The extension of the sockets to provide additional length may similarly be accomplished in various manners. In FIG. 11b, the socket 45 is extended by having extending portion 47 of a narrower diameter than the socket 45. In FIG. 11c, the socket 46 is elongated forming a hollow tube of similar diameter along its entire length. The affixation of some of these extender sockets in candles 48 are illustrated in FIGS. 12a–c.

Where candles are desired to be mounted in existing candelabra or other mountings, an adaptor such as illustrated in FIGS. 13a–d may be employed. The adaptor 49 such as shown in FIG. 13a has a shape adapted to snugly fit within a candle receptacle (not shown) the adaptor 49 preferably of a height equal to or less than the receptacle. In such manner, when the candle 50 is mounted on the adaptor 49 and the adaptor 49 inserted within the receptacle, the adaptor 49 is not visible. The exploded views of FIGS. 13, b, c, and d show various adaptors 51, 52 and 53. In FIG. 13b, the adaptor 51 includes a plurality of selective openings 54 for a plug 55 to fit within. It is readily understood that the openings in the adaptors can be of a variety of shapes. Where the plug 55 is centrally located within the candle 56, the central opening on the adaptor 51 is employed. Where, however, as shown in FIG. 13d the plug 57 is off center, such as could be the case in various of the stem-wick plugs or core-wick plugs, a mated off center opening 58 is employed.

As shown in FIG. 13c the adaptor 52 is employable to mount a wider diameter candle 59 in a narrower receptacle, since it is the adaptor 52 dimensions which determine the acceptability of the candle 59 to the receptacle.

Further variations of the relationship of the size and shape of adaptors 61 and candles 60 are illustrated in FIGS. 14a–f. Where the adaptors 61 are of combustible material a non-flammable plate or coating shown herein as, for example metal, may cover the top of them.

An example of an adaptor 62 with plural openings 63 thereon is shown in FIG. 15. FIG. 16 illustrates various opening shapes for adaptors.

FIGS. 17a–e illustrate in cross-section various of the adaptors including multi-purpose adaptors. In FIG. 17a, the adaptor 64 includes an opening 65 threaded to mate the plug 66 of the candle 67. FIG. 17b illustrates an adaptor 68 whose opening 69 provides a tapered channel which accepts the plug 70. The longitudinal opening in the adaptor may be of varying diameter such as illustrated in FIGS. 17c and e wherein the channel opening 71 has a wider diameter at its upper section 72 and a narrower diameter at its lower section 73. Narrower plugs such as plug 74 of FIG. 17c fits snugly within the lower section 73 and is held therein. A wider diameter plug, such as plug 75 in FIG. 17e fits with the upper section 71 and is stopped by the stepping in the channel formed by the variance in diameter.

FIG. 17d shows a candle 76 such as a core-wick candle wherein the plurality of openings in the adaptor 77 allows for central mounting of the candle 76. A band 76a may link the core and wick so as to prevent the falling off of the wick at a point in burning.

The adaptor 78 such as shown in FIG. 10 may include an extended socket 79 to mate with a recessed plug 80 embodiment of the present invention. The socket 79 may be integral to the adaptor 78 or a supplemental socket such as shown in FIGS. 11a–e.

Adaptors, if of sufficient size and shape may act as a base, or as shown in FIGS. 19–21a and b, bases may be especially provided. In FIG. 19, the candle 81 is mounted on a rectangular base which has integral thereto means to accept the plug of the candle 81. As shown in FIGS. 20a and b the bases, 83 and 84 respectively may be provided with an open channel 85 for an extended plug 86 or a raised socket 87 to mate the recessed plug 88.

If the candle body portion is desired to be positioned spaced apart from the base, an elongated plug 89 and base 90 such as shown in FIG. 21a configuration may be employed, where the plug is recessed, such as the plug 91 of FIG. 21b, an extender socket 92 may be employed.

As shown in FIG. 21a, a stabilizing band 89a of either consumable or non-consumable material may be integral to or supplemental to the core to provide a stop against longitudinal displacement.

The candle mountings herebefore described have provided the male mounting on the candle, however as shown in FIGS. 22–36, the rigid wick, core-wick or cores of the present invention may be employed to construct a female receptacle adapted to accept a supplemental plug for mounting.

FIG. 22 illustrates in perspective the lower section of a candle 93 having an integral receptacle 94. As shown in cross section in FIGS. 23a–e, various methods are available to provide such integral receptacle. In FIG. 23a, a wick 95 such as described in FIG. 1a is employed with the fibrous inner core of wicking removed from the lower section, providing a receptacle 96 formed out of the outer portion 97 of the rigid wick. In FIG. 23b, a similar result is obtained by hollowing the wax center of the central portion along the lower section of a core-wick 98 to form the receptacle 99.

In FIGS. 23c–e, receptacles 100, 101 and 102 respectively are provided by the insertion within the hollowed out base of a candle, receptacle sockets 103, 104 and 105 respectively. Each of these receptacle sockets 103, 104, 105, includes a portion thereof adapted to engage the end portion of the stiffening core of the candles. Various size and shape variations may be employed to render the desired receptacle size. The affixation of the sockets 103, 104, 105 may of course be as part of the initial manufacture of the candles, core or core-wick combinations.

Various devices are employable to link the candle through its receptacle to a supplemental plug, base or adaptor, thus a supplemental plug 106 such as shown in FIGS. 24 and 25 may be inserted within the candle 107 to mate within the receptacle 108.

In FIGS. 26 and 27 the candle 109 is shown receiving within its receptacle 110 a supplemental socket 111.

The size and shape of the supplemental socket and supplemental plugs may be varied with respect to dimensions to suit specific purposes.

Where adaptors are to be employed to mount the candles within candelabra or otherwise as aforedescribed, the adaptors, such as illustrated in FIGS. 28, 29a and 29b may be provided with integral portions adapted to mate the candle receptacles.

As shown in FIG. 28, once the mounting is effected, the means therefor are not visible thus allowing for varied interchange when other supplemental means are employed to alter the presentation of the candle for varied desires during use. FIG. 29a shows a candle 112 and adaptor 113 combination for flush mounting. Where the adaptor is flammable, or subject to distortion by heat the adaptor 114 may include a shield 115 of non-flammable material over all areas which have direct contact with the candle 116.

The spacing apart of the candle body and the adaptor may be accomplished in a variety of ways, depending upon the male or female characteristics of the extender portion and adaptor. Thus as shown in FIG. 30, a hollow extender 117 which fits within the receptacle of the candle 118 may be mounted on a male adaptor 119. Mounting of the same configuration on a female adaptor 120 such as shown in FIG. 35 may be accomplished by use of a converter socket 121 such as shown in FIG. 31. It should be noted that the converter socket 121 of FIG. 31 is also employable on a male plug candle as aforedescribed. Thus similar structure may serve a myriad of uses for conversion purposes.

As with the integral plug candles, the integral receptacle candles may be mounted on various shaped adaptors such as illustrated by adaptors 122, 123 and 124 in FIGS. 32a, 32b and 32c.

The advantages of a multi-channeled or opening adaptor may also be had such as shown in the adaptor 120 of FIG. 35.

Direct mounting to bases, in lieu of the implementation of adaptors is also available such as shown in FIGS. 33, 34a and 34b with the base having either an integral portion adapted to mate with the receptacle, or through the use of a supplemental plug for mating.

The receptacles may be provided with various cross-sectional configurations such as shown in FIG. 36.

Reinforcing structure may be employed in all embodiments if desired, and it is desirable that the mating of all elements be effected to provide a firm interconnection.

In such manner, the rigidity of the mount is imparted to the plug or receptacle and since the plug or receptacle is part of an element which extends longitudinally substantially along the entire length of the candle; the entire element and thus the entire candle is fully supported.

It should be noted that the element imparting firmness to the candle and anchoring means for maintaining the candle may be so positioned as to extend longitudinally along the lesser portion of the candle length, for example the lower half section or for some other desired length.

The terms and expressions which are employed are used as terms of description; it is recognized, though, that various modifications are possible within the scope of the invention claimed.

Having thus described certain forms of the invention in some detail, what is claimed is:

1. In a candle, an integral supportive maintaining device comprising a rigidizing burnable member adapted to act as a supportive anchoring portion, said member extending longitudinally along a substantial portion of at least the lower section of said candle, said member substantially evenly burnable by the descending flame of said candle as a portion of said member is exposed above the fuel level of said candle by said flame, one end of said member having means to engage a candle mounting member.

2. The invention of claim 1 wherein said member comprises an outer portion and an inner portion, said outer portion including a plurality of interstices along its length and said inner portion including a wicking material.

3. The invention of claim 1 wherein said member comprises a core, said core extending substantially along the length of said candle in a substantially parallel alignment to the wick of said candle.

4. The invention of claim 1 wherein said member comprises a core adapted to carry a stem-wick.

5. The invention of claim 1 wherein said member extends outward from the base of said candle to form a plug.

6. The invention of claim 5 wherein said plug includes an outer layer of reinforcing material.

7. The invention of claim 5 wherein the diameter of said member outward of the base of said candle is greater than the diameter of member internal of said candle.

8. The invention of claim 5 wherein the diameter of said member internal of the base of said candle is greater than the diameter of said member external of said candle.

9. The invention of claim 5 wherein said member comprises an outer portion including a plurality of interstices internal of said candle, said outer periphery of said outer portion being unbroken external of said candle.

10. The invention of claim 5 wherein said engaging means includes a pointed end portion on said member adapted to anchor said member to a surface.

11. The invention of claim 5 wherein said candle mounting member includes a base portion, said base having an opening therein adapted to receive the end portion of said outwardly extending member.

12. The invention of claim 11 further including ornamentation adapted to be mounted on said member along the portion of said member extending between the base of said candle and said base portion.

13. The invention of claim 1 wherein said candle includes an opening in its base and said member is recessed within said opening to form a recessed plug.

14. The invention of claim 1 wherein said member extends to the base of said candle, the lower section of said member including an outer periphery and an inner core of a lesser diameter than said outer periphery, said outer periphery and said inner core spaced apart to form a recessed plug in the base of said candle.

15. The invention of claim 13 wherein said candle mounting member includes a base, said base including vertically extending socket means thereon adapted to mate said recessed plug.

16. The invention of claim 13 wherein said engagement means includes socket means adapted to mate said recessed plug, said socket means having means extending therefrom adapted to be anchored to said mounting member.

17. The invention of claim 16 wherein said socket means includes openings therein.

18. The invention of claim 16 wherein said socket means includes slots.

19. The invention of claim 1 wherein said candle mounting member includes an adaptor and means to link said candle member within said adaptor, said adaptor adapted to snugly fit within a candle receptacle.

20. The invention of claim 19 wherein the diameter of the base of said candle is different than the diameter of the upper portion of said adaptor.

21. The invention of claim 19 wherein said linking means includes the extension of said candle member beyond the base of said candle to form an external plug and at least one longitudinal opening on said adaptor to receive said external plug.

22. The invention of claim 21 wherein said adaptor includes a plurality of selected openings to receive said external plug.

23. The invention of claim 21 wherein said external plug includes threads along the end portion thereof and said opening is threaded to mate said plug.

24. The invention of claim 21 wherein said opening is tapered and said external plug is adapted to be wedged within said tapered opening.

25. The diameter of claim 21 wherein said opening is of varying diameters along its length.

26. The invention of claim 19 wherein said linking means includes a recessed plug within an opening in the base of said candle and socket means on said adaptor adapted to mate said recessed plug.

27. The invention of claim 19 wherein said adaptor includes a non-flammable shield along its top portion.

28. The invention of claim 1 wherein said member is linked to the wick of said candle.

29. The invention of claim 1 further including means on said member adapted to stop said member against longitudinal displacement within said candle.

30. The invention of claim 29 wherein said stop means includes a wider diameter portion of material similar to the material of said member on said member internal of said candle.

31. The invention of claim 1 wherein said candle member includes a receptacle opening on the base of said candle adapted to receive linking means to anchor said candle.

32. The invention of claim 31 wherein said member comprises an outer core of substantially rigid material and an inner core of wicking, said receptacle formed by said outer core with said inner core of wicking removed.

33. The invention of claim 31 wherein said member comprises an outer core of substantially rigid material, an inner core of wicking and a body of wax intermediate said inner and outer cores, said receptacle formed by the removal of said inner core and wax from a portion of said member.

34. The invention of claim 31 wherein said receptacle includes a socket mounted within an opening in the base of said candle, said socket including means thereon to link said socket to said candle member internal of said candle.

35. The invention of claim 31 wherein said linking means includes a supplemental plug, one end of said supplemental plug adapted to mate said receptacle and the other end of said supplemental plug adapted to be anchored to a surface.

36. The invention of claim 35 wherein said supplemental plug includes a socket portion therein adapted to receive candle anchoring means.

37. The invention of claim 31 wherein said linking means includes an adaptor, said adaptor having an upward extending portion to snugly fit within said receptacle, said adaptor being adapted to fit within a candle mount.

38. The invention of claim 37 wherein said upward extending portion includes a non-flammable shield thereon.

39. The invention of claim 31 wherein said linking means includes a supplemental socket, a first portion on said supplemental socket adapted to fit within said receptacle and a second section on said socket adapted to extend outward of said receptacle, said second section adapted to link said socket to a mounting surface.

40. The invention of claim 31 wherein said linking means includes a base, said base having an upward extending portion adapted to snugly fit within said receptacle.

References Cited
UNITED STATES PATENTS

| | | | |
|---|---|---|---|
| 1,714,674 | 5/1929 | King | 431—295 X |
| 2,001,377 | 5/1935 | Candy | 431—291 |
| 3,105,373 | 10/1963 | Villemure et al. | 431—288 |
| 3,208,245 | 9/1965 | Turner | 431—288 X |
| 3,283,546 | 11/1966 | Matsui | 431—288 X |

FOREIGN PATENTS 16,702   1915   Great Britain.

CHARLES J. MYHRE, Primary Examiner

U.S. Cl. X.R.

431—296, 297